United States Patent
Folkmer et al.

(10) Patent No.: US 6,561,029 B2
(45) Date of Patent: May 13, 2003

(54) ROTATIONAL RATE GYROSCOPE WITH DECOUPLED ORTHOGONAL PRIMARY AND SECONDARY OSCILLATIONS

(75) Inventors: Bernd Folkmer, VS-Villingen (DE); Wolfram Geiger, Niedereschach (DE); Walter Lang, VS-Villingen (DE); Udo Sobe, Oberbobritzsch (DE)

(73) Assignee: Hahn-Schickard-Gesellschaft fur angewandte Forschung E.V., Willingen-Schwenningen (DE)

( * ) Notice: Subject to any disclaimer, the term of this patent is extended or adjusted under 35 U.S.C. 154(b) by 0 days.

(21) Appl. No.: 10/039,926

(22) Filed: Nov. 6, 2001

(65) Prior Publication Data

US 2002/0088279 A1 Jul. 11, 2002

Related U.S. Application Data

(62) Division of application No. 09/269,520, filed as application No. PCT/EP97/05445 on Oct. 2, 1997, now Pat. No. 6,349,597.

(30) Foreign Application Priority Data

Oct. 7, 1996 (DE) .......................................... 196 41 284

(51) Int. Cl.[7] ................................................. G01P 9/04
(52) U.S. Cl. .................................. 73/504.14; 73/504.12
(58) Field of Search .......................... 73/504.12, 504.02, 73/504.04

(56) References Cited

U.S. PATENT DOCUMENTS

| 4,699,006 A | | 10/1987 | Boxenhorn | 73/504.12 |
| 5,734,105 A | * | 3/1998 | Mizukoshi | 73/504.12 |
| 5,955,668 A | | 9/1999 | Hsu et al. | 73/504.12 |

FOREIGN PATENT DOCUMENTS

| DE | 4444149 A1 | 6/1995 |
| DE | 19500800 A1 | 12/1995 |
| DE | 4428405 | 2/1996 |
| EP | 0572976 | 12/1993 |
| EP | 0634629 A1 | 1/1995 |
| JP | 5312576 | 11/1993 |
| JP | 6123631 | 5/1994 |
| JP | 6249667 | 9/1994 |
| JP | 7120266 | 5/1995 |
| JP | 8159776 | 6/1996 |

OTHER PUBLICATIONS

P. Greiff et al., "Silicon Monolithic Micromechanical Gyroscope", 1991, The Charles Stark Draper Laboratory, IEEE, pp. 966–968.

A. Selvakumar, "Vertical Comb Array Microactuators", IEEE, Micro Electrochemical Systems, 1995, pp. 43–48.

* cited by examiner

*Primary Examiner*—John E. Chapman
(74) *Attorney, Agent, or Firm*—Beyer Weaver & Thomas, LLP (57) ABSTRACT

A rotational rate gyroscope for detecting rotation thereof comprises a base member, a primary oscillator supported by its primary oscillator suspension so as to be movable with respect to the base member, and a secondary oscillator supported by a secondary oscillator suspension, separate from primary oscillator suspension, so as to be movable with respect to the primary oscillator. The secondary oscillator suspension is designed such that movement that can be applied to the primary oscillator can be transferred to the secondary oscillator, whereas the movement of the secondary oscillator effected by the Coriolis force substantially is not transferred back to the primary oscillator. In addition thereto, the major surfaces of the primary oscillator and of the secondary oscillator extend substantially in the same plane, with the movement of the primary oscillator and/or of the secondary oscillator also taking place in this plane.

7 Claims, 5 Drawing Sheets

ROTATIONAL RATE GYROSCOPE WITH DECOUPLED ORTHOGONAL PRIMARY AND SECONDARY OSCILLATIONS

This is a divisional of U.S. patent application Ser. No. 09/269,520 now U.S. Pat. No. 6,349,597 B1 filed on Jun. 7, 1999 and issued on Feb. 26, 2002, which is the National Stage of International Application No. PCT/EP97/05445, which was published in German on Apr. 16, 1998 and which claims priority from Federal Republic of Germany Application No. 19641284.6, filed Oct. 2, 1996, which are incorporated by reference.

FIELD OF THE INVENTION

The present invention relates to movement sensors and in particular to micromechanical rotational rate gyroscopes using the Coriolis force.

BACKGROUND ART

Micromechanical Coriolis-force rotational rate gyroscopes have many fields of application, for example the determination of the position of a motor vehicle or aircraft. Such devices or sensors in general have a movable mechanical structure that is excited to perform a periodic oscillation. This periodic oscillation induced by excitation is referred to as primary oscillation. When the sensor experiences a rotation about an axis perpendicular to the primary oscillation or primary movement, the movement of the primary oscillation results in a Coriolis force proportional to the measurement quantity, i.e. the angular velocity. The Coriolis force induces a second oscillation orthogonal to the primary oscillation. This second oscillation orthogonal to the primary oscillation is referred to as secondary oscillation. The secondary oscillation, which is also termed detection oscillation, can be detected by several measuring methods, with the quantity detected serving as a measure for the rotational rate acting on the rotational rate gyroscope.

To generate the primary oscillation, thermal, piezoelectric, electrostatic and inductive methods are used among others, which are known in the art. For detecting the secondary oscillation, piezoelectric, piezoresistive and capacitive principles are state of the art.

DESCRIPTION OF PRIOR ART

Known micromechanical rotational rate gyroscopes are described in K. Funk, A. Shilp, M. Offenberg, B. Elsner and F. Lärmer, "Surface Micromachining Resonant Silicon Structures", The 8th International Conference on Solid-State Sensors and Actuators, Eurosensors IX, NEWS, pages 50 to 52. In particular, a known, quasi-rotating gyroscope described in that publication comprises a circular oscillator supported on a base so as to be rotatable in two directions. The oscillator of the known gyroscope is of disc-shaped configuration with respect to an x-y plane, with comb electrode configurations be attached on two opposite sides of the disc. A comb electrode configuration is used for driving the oscillating body and is composed of fixed comb electrodes and the comb electrodes of the oscillator engaging with the fixed comb electrodes. A similar comb electrode detection assembly consists of fixed comb electrodes engaging with corresponding comb electrodes attached to the primary oscillator. The comb electrode configuration on the input side serving for driving the oscillator and being also referred to as comb drive, is suitably connected to an excitation voltage, such that a first comb electrode configuration is fed with an a.c. voltage, whereas a second comb electrode configuration of the comb drive is fed with a second voltage phase-shifted by 180° with respect to the first voltage. Due to the applied a.c. voltage, the oscillator is excited to perform a rotational oscillation about the z axis normal to the x-y plane. The oscillation of the oscillator in the x-y plane is the afore-mentioned primary oscillation.

When the known gyroscope is rotated about an y axis with a specific angular velocity, a Coriolis force acts on the oscillator that is proportional to the applied angular velocity about the y axis. This Coriolis force generates a rotational oscillation of the oscillator about the x axis. This rotational oscillation or periodic "tilting" of the oscillator about the x axis can be measured capacitively by means of the two electrodes located underneath the gyroscope or sensor.

A disadvantage of this known structure consists in that the primary oscillation and the secondary oscillation, which is the oscillation of the oscillating body due the Coriolis force acting thereon, are carried out by one single oscillator supported by means of a two-axis joint in order to be able to perform the two mutually orthogonal oscillations. The two oscillation modes, i.e. the primary oscillation and the secondary oscillation, thus are not decoupled from each other, and this is why the intrinsic frequencies of primary and secondary oscillations cannot be balanced in exact manner independently of each other in order to obtain an as high as possible sensing accuracy of the rotational rate gyroscope. Furthermore, in case of the known gyroscope, the secondary oscillation has the effect that the comb electrode assembly for driving the oscillator is tilted, thereby affecting the primary oscillation by the secondary oscillation. This influence results in a primary oscillation that is not controlled in fully harmonic manner, which is a reaction to the retroactive effect of the secondary oscillation on the primary oscillation, i.e. a reaction to tilting of the comb drive for generating the primary oscillation.

Another known rotational rate gyroscope described in that publication comprises two mutually separate oscillatory masses which may be brought into opposite-phase oscillation by respective comb drives connected to one mass each by spring beams. The two masses are connected to each other by a spring beam arrangement and, due to suspension of the assembly of the two masses and the connecting webs of the masses, carry out a rotational oscillation in the x-y plane when the gyroscope is subjected to rotation about the z axis. Displacement of the assembly of the two masses and the spring beams mutually connecting the masses, in the direction of the y axis as a reaction to rotation of said assembly is detected capacitively by means of four comb electrode configurations.

Just as the first known gyroscope described, the second known gyroscope also comprises merely one single oscillator both for the primary oscillation and for the secondary oscillation, so that the two orthogonal oscillation modes are coupled with each other and the secondary oscillation generated by the Coriolis force may have a retroactive effect on the primary oscillation. This structure, too, thus permits no exact selective balancing of the intrinsic frequencies of the primary and secondary oscillations.

A further known oscillatory gyroscope is described in the article by P. Greiff et al., entitled "Silicon Monolithic Micromechanical Gyroscope" in the conference band of Transducers 1991, pages 966 to 968. This gyroscope is a double gimbal structure in the x-y plane, which is supported by torsion springs. A frame-shaped first oscillator structure surrounds a plate-shaped second oscillator structure. The second oscillator structure comprises an inertia element projecting in z-direction from the plane thereof. In operation, rotary excitation about the y axis of the first oscillator structure is transferred by torsion springs rigid in the direction of the first oscillation to the second oscillator structure. In the presence of an angular velocity about the z axis, a Coriolis force is generated in the y direction, which engages the projecting inertia element or gyro element in order to deflect the second oscillator structure about the x axis, whereby the second oscillator structure performs a Coriolis oscillation about the x axis orthogonal to the excitation oscillation, which is rendered possible by the torsion springs suspending the second oscillator structure on the first oscillator structure. The Coriolis force present with this gyroscope only in y direction does not result in movement of the remaining structure since the latter is fixedly held in the y direction. Only the gyro element projecting in y direction offers a point of application for the Coriolis force, so that this force can effect a measurable movement proportional to the forced rotation.

Although the first and second oscillations are decoupled from each other in this structure and no retroactive effect of the second oscillation on the excitation of the first oscillation takes place, a disadvantage resides in that the second oscillator structure cannot be made in planar manner due to the projecting gyro element. Upon manufacture of the gyroscope structure, the gyro element is formed by gold electroplating on the second oscillator structure. Such electroplating is not favorable for integration in a substantially planar monolithic manufacturing process, causing an increase in manufacturing time and manufacturing steps as well as rising costs for the gyroscope.

DE 44 28 405 A1 discloses a rotational rate gyroscope comprising an excitation actuation mechanism with comb drives and two oscillatory masses connected to each other via spring members so as to constitute an oscillatory system. The gyroscope comprises in particular a first oscillation structure that can be excited by means of comb drives so as to perform an excitation oscillation. Via connecting points, the excitation oscillation is transferred from the first oscillation structure to a second mass. Various springs and holding means connect the second mass to a central oscillatory mass, the springs having the effect of transferring the excitation oscillation from the second oscillatory mass to the central oscillatory mass and of causing the two oscillatory masses to oscillate with mutually opposite phases due to the excitation oscillation. Upon rotation of the gyroscope, a Coriolis force acts among other things on the central oscillatory mass, having the effect that said mass moves perpendicularly to the excitation oscillation. The Coriolis force acts also on the second mass, the latter experiencing a Coriolis oscillation opposite to the central mass, which is opposite for the reason that the two m asses have excitation oscillations of opposite phases.

DE 195 00 800 A1 discloses Coriolis rotational rate gyroscopes having two oscillatory masses which are mechanically coupled to each other and constitute an oscillating structure. The two oscillatory masses, on their opposite faces, each have two symmetrically arranged bending springs by means of which the oscillatory masses are mechanically coupled with each other using additional silicon webs. In a first category of Coriolis gyroscopes, the secondary oscillators are excited directly, without the use of a primary oscillator. In case of a second category of Coriolis gyroscopes, two oscillatory masses are excited by a primary oscillator to oscillate with opposite phases, with a web transferring the primary oscillation to the secondary oscillators the oscillation of which passes through a holding point connected to a substrate, as well as through springs attached to the substrate.

EP 0 634 629 A discloses an angular velocity sensor comprising a first oscillating member supported by a first supporting beam, and a second oscillating member connected to the first oscillating member by means of a second supporting beam. The firs t supporting beam, through which the first oscillating member is connected to the substrate, is provided in addition with a comb drive in order to cause the first oscillating member to oscillate in a first direction. The second supporting beam connecting the first oscillating member and the second oscillating member also permits oscillation in the first direction, whereby the excitation oscillation on the one hand is transferred to the second oscillating member and on the other hand is increased. Upon rotation of the angular velocity sensor about an axis normal to the first direction, a Coriolis force acts on the arrangement, which causes deflection of the second oscillating member in z direction. In doing so, the first oscillating member is held so as to be movable in the direction of the Coriolis force.

SUMMARY OF THE INVENTION

It is the object of the present invention to provide a rotational rate gyroscope which can be produced in economical manner and in which primary oscillation and secondary oscillation are largely decoupled.

This object is met by a rotational rate gyroscope for detecting rotation thereof about an axis of rotation, comprising: a base member; a primary oscillator adapted to be excited to perform a primary movement which is directed normal to the axis of rotation or about an axis normal to the axis of rotation, respectively; a secondary oscillator adapted to be caused, by a Coriolis force, to perform a secondary movement which is directed normal to the axis of rotation or about an axis normal to the axis of rotation, respectively, and normal to the primary movement, with major surfaces of the primary oscillator and the secondary oscillator extending substantially in the same plane and the movement of the primary oscillator and/or the movement of the secondary oscillator taking place in this plane; a first spring means constituting a primary oscillator suspension and holding the primary oscillator so as to be movable with respect to the base member; a second spring means separate from the first spring means and connecting the primary oscillator to the secondary oscillator and constituting a secondary oscillator suspension, wherein the primary oscillator suspension is designed such that it moves the primary oscillator in the direction of the primary movement, and that the secondary oscillator suspension is designed such that it transfers the primary movement to the secondary oscillator substantially in rigid manner; that it moves the secondary oscillator in the direction of the secondary movement; and that it substantially prevents a transfer of the secondary movement back to the primary oscillator.

The invention is based on the finding that decoupling of primary and secondary oscillations can be achieved by providing a primary oscillator held so as to be movable with respect to a base member by means of a primary oscillator suspension. A primary oscillation applied to the primary oscillator is transferred via a secondary oscillator suspension to a secondary oscillator, so that the secondary oscillator also performs the primary oscillation. A Coriolis force present due to rotation of the rotational rate gyroscope results in a secondary oscillation of the secondary oscillator orthogonal to the primary oscillation of the secondary oscillator which, by way of a suitable design of the secondary oscillator suspension, has no retroactive effect on the primary oscillator. The primary oscillator suspension, depending on the particular embodiment, may consist of suitably dimensioned spring beams (e.g. torsion springs or bending springs) being of such cross-section and geometric arrangement (e.g. diagonal struts, number etc.) that it provides a direction-dependent spring rigidity. This anisotropy of the rigidity of the suspension in principle can be guaranteed solely by the arrangement of the spring beams. The secondary oscillation thus has no retroactive effect on the primary oscillator, so that the excitation is not influenced by the quantity to be measured. By providing a secondary oscillator separate from the primary oscillator and due to the configurations of the primary oscillator suspension and the secondary oscillator suspension, which also is spatially separate from the primary oscillator suspension and has only preferably an anisotropic rigidity, the primary and secondary oscillations are decoupled from each other to the largest possible extent, so that both, the primary oscillation and the secondary oscillation can be balanced independently of each other.

A two-axis joint for an oscillator, as present in the prior art, which so to speak is concentrated in one spatial spot and which permits the mutually orthogonal primary and secondary oscillations of the sole oscillator, is converted in the rotational rate gyroscope according to the present invention to two mutually separate joints and oscillators, which on the one hand constitute the primary oscillator suspension and primary oscillator, respectively, and on the other hand constitute the secondary oscillator suspension and secondary oscillator, respectively. The provision of a second oscillator, i.e. the secondary oscillator, which is connected to the primary oscillator via the secondary oscillator suspension, permits the two oscillations to be decoupled. The primary oscillator is driven to perform a translational or rotational oscillation which via the secondary oscillator suspension is transmitted to the secondary oscillator. A Coriolis force acting due to rotation of the rotational rate gyroscope, by way of a suitable design of the primary oscillator suspension, however acts only on the secondary oscillator, and not on the primary oscillator, so that said excitation is not influenced by the quantity to be measured. Furthermore, the oscillation of the secondary oscillator due to the Coriolis force can be transferred only insignificantly to the movement of the primary oscillator by the secondary oscillator suspension. The rotational rate gyroscope according to the present invention thus indeed permits a transmission of the primary oscillation from the primary oscillator to the secondary oscillator, but no transmission of the secondary oscillation back to the primary oscillator.

Due to the construction of the vibratory gyroscope according to the present invention in such a manner that both the primary and the secondary oscillators extend substantially in the same plane, manufacture becomes simple since the vibratory gyroscope can be manufactured in fully compatible manner with known planar manufacturing techniques. Due to the fact that, in addition thereto, the primary oscillation and/or the secondary oscillation take place in the plane in which primary oscillator and secondary oscillator are formed as well, the Coriolis force always can act on the substantially planar secondary oscillator such that it can be excited to oscillate.

BRIEF DESCRIPTION OF THE DRAWINGS

Preferred embodiments of the present invention will be described hereinafter in more detail with reference to the accompanying drawings, wherein.

DETAILED DESCRIPTION OF PREFERRED EMBODIMENTS

Figure 1A:
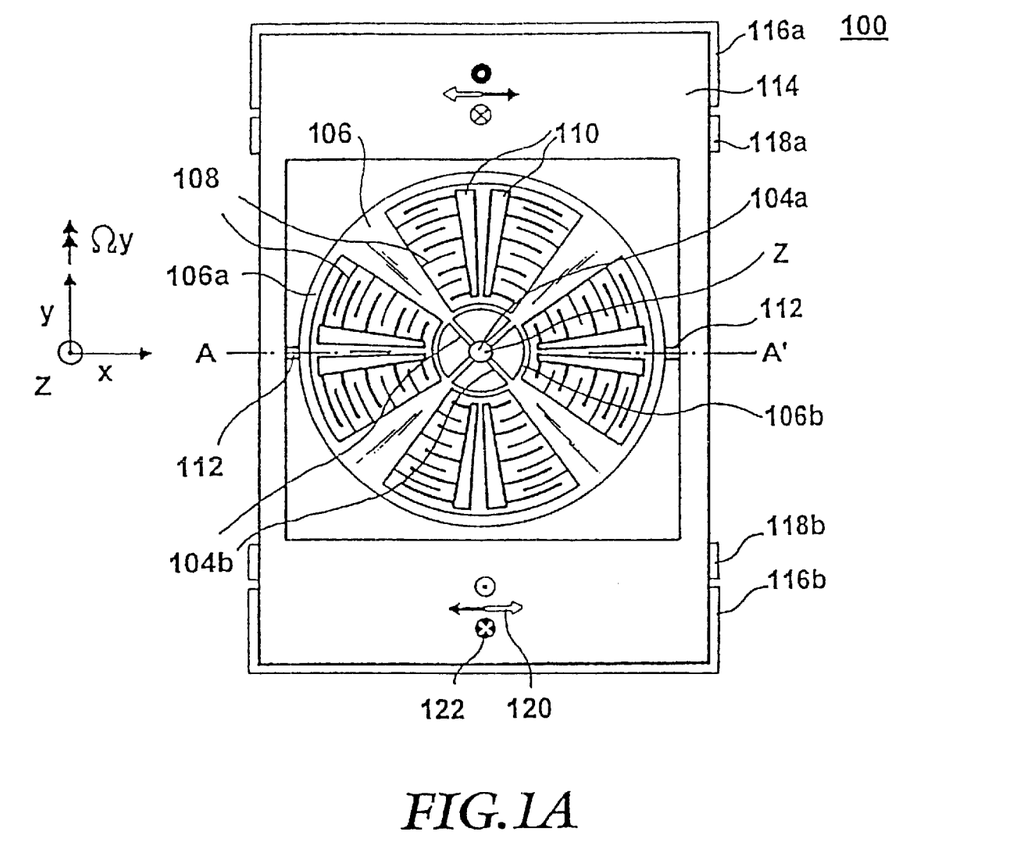
FIG. 1A shows a plan view of a rotational rate gyroscope according to a first embodiment of the present invention.
Figure 1B:
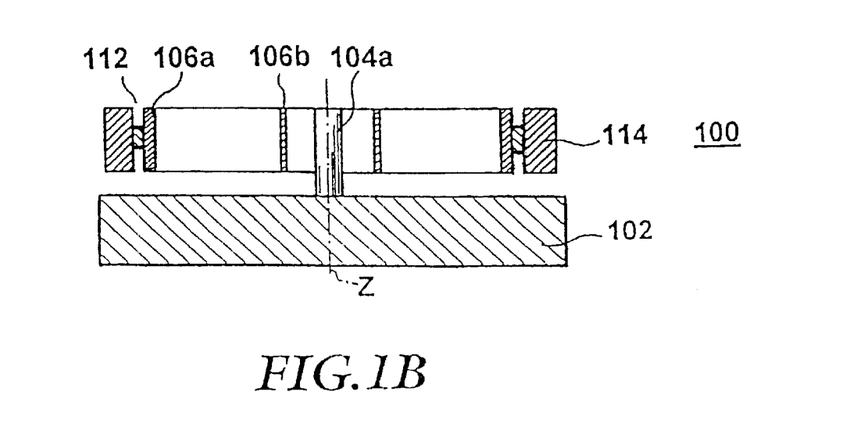
FIG. 1B shows a cross-sectional view of the rotational rate gyroscope of FIG. 1A.

FIG. 1A shows in a plan view a rotational rate gyroscope 100 according to a first embodiment of the present invention, whereas FIG. 1B shows a schematic cross-section of rotational rate gyroscope 100 along the line A–A' of FIG. 1A. Rotational rate gyroscope 100 comprises a base member 102 having attached thereto a primary oscillator 106 by means of a primary oscillator suspension 104 including an anchoring means 104a and four spring beams 104b. Primary oscillator 106 comprises an outer ring 106a and an inner ring 106b. Between outer ring 106a and inner ring 106b of primary oscillator 106 there are disposed groups of comb-like electrodes 108. The electrode groups 108 of the primary oscillator each engage in finger-like manner in opposite, fixed electrode groups 110. Differently from the primary oscillator suspension according to the first embodiment, there can be provided four anchoring means are arranged in the x-y plane in such a manner that connecting lines between two opposite anchoring means each constitute a right angle with each other. At the intersection of these connecting lines designed as spring beams, i.e. at the center of symmetry of the primary oscillator suspension, the e.g. four spring beams (104) will be disposed then.

An electrode group 108 of the primary oscillator, together with a fixed electrode group 110 disposed opposite thereto, constitutes a so-called comb drive functioning in conventional manner. The fixed electrode groups 110, for example, may be connected to base member 102 or may be fixedly arranged opposite the primary oscillator in a different manner, which however is not shown in FIG. 1B for reasons of clarity. Primary oscillator 106 is connected via torsion springs 112 to a secondary oscillator 114. Torsion spring 112 thus constitutes the secondary oscillator suspension by means of which secondary oscillator 114 is mechanically coupled to primary oscillator 106.

In a rotational rate gyroscope according to the first embodiment of the present invention, secondary oscillator 114 may assume a rectangular configuration, having a recess in which primary oscillator 106 is disposed, as shown in FIG. 1A. At the upper and lower side of the secondary oscillator, respectively, there are provided, underneath the same on base member 102, first sensing electrodes 116a, 116b as well as optionally additional electrodes 118a, 118b, the function of which will be described hereinafter.

For elucidating the function of the rotational rate gyroscope 100 as well as all additional rotational rate gyroscopes according to the present invention, reference will be made in the following to the respective Cartesian coordinate system depicted to the left in each of the figures, having the mutually orthogonal axes x, y and z.

When rotational rate gyroscope 100 is utilized for detecting a rotation thereof about the y axis with an angular velocity $\Omega_y$, primary oscillator 106 has to be excited to perform a rotational oscillation. This takes place in a manner known to those having ordinary skill in the art, by application of suitable a.c. voltages to respective opposite comb drives constituted by the respective interengaging electrode groups 108 of primary oscillator 106 as well as by respective fixed electrode groups 110 opposite thereto. A comb drive performs the capacitive drive principle as known to those having ordinary skill in the art. For exciting primary oscillator 106 to perform a rotational oscillation in the x-y plane, it is possible to use, for example, four comb drives, while the other four comb drives are utilized for capacitive detection of this very rotational oscillation in the x-y plane. In case of rotation of primary oscillator 106 about the z axis, the four spring beams 104b are each deflected with respect to the z axis by a torque. The four spring beams 104b are of rectangular cross-section, with the long side of the cross-section extending in z axis direction whereas the short side thereof extends in the x-y plane.

The oscillation of primary oscillator 106 in the x-y plane thus is transferred via torsion springs 112 to the secondary oscillator whereby the latter also performs a rotation in the x-y plane, as indicated schematically by arrows 120. The Coriolis force acting on the secondary oscillator due to rotation of the rotational rate gyroscope 100 about an axis parallel to the y axis results in a rotational oscillation of secondary oscillator 114 about the x axis, as shown symbolically by the known notation 122. The Coriolis force, which of course also acts on primary oscillator 106, however, does not lead to tilting of primary oscillator 106 about the x axis, due to the geometry of the spring beams 104b described, i.e. the primary oscillator suspension 104. Furthermore, secondary oscillator 114 cannot transfer its rotary motion about the x axis due to the Coriolis force to the primary oscillator 106, since torsion springs 112 exhibit a significantly lower torsional rigidity with respect to rotation about the x axis than primary oscillator suspension 104 consisting of anchoring means 104a and spring beams 104b.

Movement of secondary oscillator 114, which may consist of an electrically conductive material, such as e.g. polysilicon, is capacitively detected by means of sensing electrodes 116a and 116b located underneath the same. The presence of two sensing electrodes 116a and 116b permits the use of a differential measuring method by means of which, among other things, the sensitivity of the sensor is doubled in known manner in comparison with a simple measuring method.

By feedback of a suitable voltage to the two sensing electrodes 116a and 116b or by application of a voltage to the additional electrodes 118a and 118b, the Coriolis force can be compensated in a specific range, thereby increasing the bandwidth of rotational rate gyroscope 100. For example, when an a.c. voltage is applied to sensing electrodes 116a and 116b or to the additional electrodes 118a and 118b, which counteracts the oscillation of secondary oscillator to a certain degree, larger Coriolis forces on secondary oscillator 114 can be measured without the mechanical system suffering from two high oscillation amplitudes.

Balancing of the intrinsic frequencies is effected by electronic adjustment of the intrinsic frequency of the secondary oscillation. Application of a d.c. voltage to electrodes 116a, 116b or to the additional electrodes 118a, 118b reduces the intrinsic frequency of the secondary oscillation. By feedback of an a.c. voltage to the electrodes mentioned, the intrinsic frequency of the secondary oscillation can also be increased. By balancing of the intrinsic frequencies, the rotational rate gyroscope becomes more sensitive for smaller angular velocities $\Omega_y$.

Thus, it can be summarized that in the first embodiment the major surfaces, i.e. the surfaces shown in FIG. 1, both of the primary and of the secondary oscillators are arranged in the x-y plane, with the primary oscillation being generated in this plane as well. Rotation of the sensor thus generates a Coriolis force normal to the x-y plane, so that no projecting parts as in case of the prior art are necessary. Furthermore, the leverage principle is utilized in advantageous manner, whereby two particularly critical difficulties are avoided in case of micromechanical realization. Relatively small bending amounts of the elongate spring beams 104b permit large deflections, i.e. a high oscillation amplitude and velocity of secondary oscillator 106 in the direction of the primary oscillation. It is thus possible to operate the spring beams 104b in the linear bending range. Another advantageous property of rotational rate gyroscope 100 according to the first embodiment of the present invention consists in the mechanical compensation of interference forces, such as e.g. forces arising from translational accelerations acting on the secondary oscillator, since secondary oscillator 114 in the direction of detection can be deflected only by torques acting around the x axis.

It is apparent to those having ordinary skill in the art that the reference to an x-y-z coordinate system merely serves to simplify the description of the present invention and to promote clarity, since rotational rate gyroscope 100 as well as all other rotational rate gyroscopes described hereinafter with respect to other embodiments of the present invention can be positioned in any arrangement desired. The reference to the x-y-z coordinate system merely serves to describe the directional relationships of the individual motions in relation to each other. It is also evident that the gyroscope or sensor, upon rotation about an arbitrary axis, detects the components in the direction of its sensitive axis (axes).

Moreover, it is apparent to those having ordinary skill in the art that the number of spring beams 104b and the arrangement thereof along the angle median line of the x-y plane is merely of exemplary nature. It is decisive that the rigidity of the suspension 104 with respect to rotation about the x axis is sufficiently large to prevent tilting of primary oscillator 106 with respect to the fixed electrodes 110 so as to avoid a retroactive effect of the secondary oscillation on the primary oscillation, i.e. on the excitation assembly for the primary oscillation. Thus, in the simplest case, already two spring beams would be sufficient that are disposed parallel to the y axis and connect the anchoring means 104a to the inner ring 106b of the primary oscillator. Arranging the spring beams 104b along the x axis is less advantageous than arranging the same in an angle with respect to the x axis. These remarks concerning the rigidity of the suspensions hold for all embodiments and in particular also for the secondary oscillator suspensions, although they will not be repeated explicitly in the following.

Figure 2:
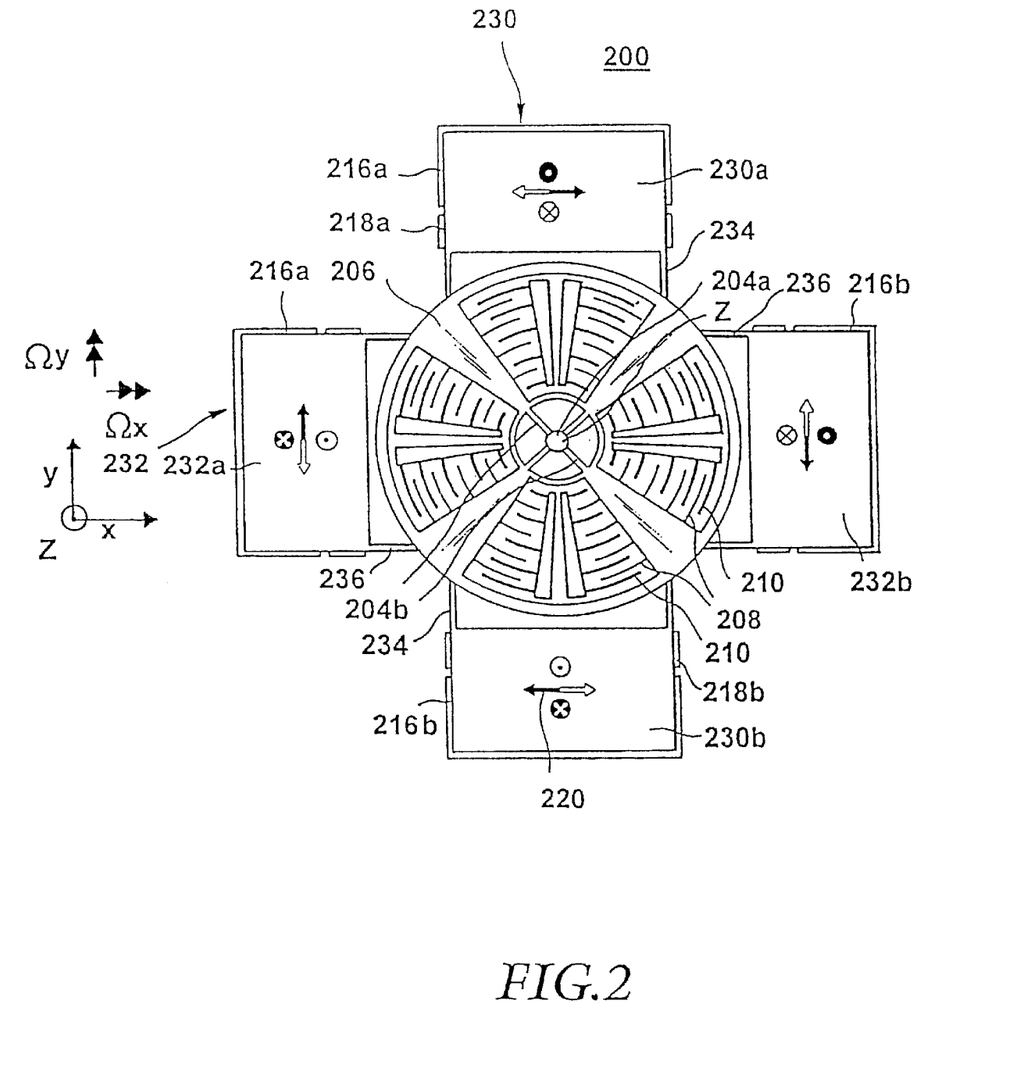
FIG. 2 shows a plan view of a rotational rate gyroscope according to a second embodiment of the present invention.

FIG. 2 shows in a plan view a second embodiment of a rotational rate gyroscope 200 according to the present invention. Rotational rate gyroscope 200 comprises a primary oscillator 206 substantially identical with primary oscillator 106 of gyroscope 100. Primary oscillator 206 is connected via a primary oscillator suspension 204, comprising an anchoring means 204a and four spring beams 204b, to a base member (not shown) in a manner corresponding to the first embodiment of the present invention.

A difference of rotational rate gyroscope 200 as compared to rotational rate gyroscope 100 consists in that gyroscope 200 is capable of detecting both a rotation thereof about an axis parallel to the y axis and a rotation thereof about an axis parallel to the x axis. This is possible by the presence of two secondary oscillators 230, 232. The first secondary oscillator 230 consists of a first part 230a and a second part 230b. The second secondary oscillator 232 likewise consists of a first part 232a and a second part 232b. The first part 230a as well as the second part 230b are connected to primary oscillator 206 via a first secondary oscillator suspension 234. Analogously therewith, the first part 232a and the second part 232b of second secondary oscillator 232 are connected to primary oscillator 206 via second secondary oscillator suspensions 236.

The first secondary oscillator 230 is oriented with respect to primary oscillator 206 in such a manner that its axis of symmetry is parallel to the y axis and intersects the z axis about which primary oscillator 206 performs a rotational oscillation. An axis of symmetry of the second secondary oscillator 232, in contrast thereto, extends normal to the axis of symmetry of the first secondary oscillator 230. The first secondary oscillator thus is oriented parallel to the y axis, whereas the second secondary oscillator 232 is oriented parallel to the x axis.

The two secondary oscillator suspensions 234 and 236 are in the form of spring beams, the spring beams of the first secondary oscillator suspension 234 and the spring beams of the second secondary oscillator suspension 236 being deflectable by a force acting in the z direction, whereas they may be substantially rigid with respect to a force in the x or y direction. The cross-sectional geometry thereof thus corresponds to a rectangle having its long side disposed in the x-y plane whereas the narrow side thereof is located in z direction. It is to be pointed out here that the cross-sectional geometry of the spring beams used in the present invention is not restricted to a rectangle, but that, for example, also an oval or different cross-sectional geometry may be used which permits such a spring beam to have a higher spring rigidity in one direction than in another direction. However, as was already pointed out, the anisotropy of the rigidity could also be obtained by suitably arranging the spring beams.

When primary oscillator 206 is excited by application of a suitable a.c. voltage to respective electrode groups 208 of the primary oscillator and corresponding fixed electrode groups 210, it will perform a rotational oscillation in the x-y plane. This rotational oscillation is transferred to secondary oscillators 230 and 232 via the first secondary oscillator suspension and via the second secondary oscillator suspension, as indicated schematically by arrows 220. Rotation of rotational rate gyroscope 22 about an axis parallel to the y axis at an angular velocity $\Omega_y$ results in a rotational oscillation of first secondary oscillator 230 about the x axis, which can be detected via sensing electrodes 216a, 216b of the primary oscillator, as described with regard to the first embodiment. Rotation of rotational rate gyroscope 200 about the x axis at an angular velocity $\Omega_x$, in contrast thereto, results in an angular oscillation of second secondary oscillator 232 about the y axis. Corresponding sensing electrodes 216a, 216b as well as additional electrodes 218a, 218b are provided under the second secondary oscillator just as underneath the first secondary oscillator.

The detection of the rotations about the x or y axis of rotational rate gyroscope 200 as well as the balancing of the intrinsic frequencies by electrostatic matching of the intrinsic frequency of the secondary oscillation take place in exactly the same manner as described with regard to the first embodiment. Thus, rotational rate gyroscope 200, just as rotational rate gyroscope 100, constitutes a sensor with electrostatic drive and capacitive measuring principle. However, it is obvious to experts that the capacitive drive as well as the capacitive measuring principle are only of exemplary nature as any other driving and measuring principles known to experts can be employed with all embodiments of the present invention described and all embodiments thereof to be still described.

An advantage of rotational rate gyroscope 200 in comparison with rotational rate gyroscope 100 consists in that a two-axis measurement of a rotation is possible. What is disadvantageous in gyroscope 200 as compared to gyroscope 100, is the fact that gyroscope 20 does not provide a mechanical compensation of translational interference forces since both the first secondary oscillator 230 and the second secondary oscillator 232 can not only be deflected by torques, but also by translational forces in z direction. Translational interferences, however, can be compensated by electrical differential measurement, since the movement of the secondary oscillators caused by rotation takes place in opposite directions, whereas translational interferences produce movement thereof with the same phase.

It is to be pointed out here that the most favorable shape of electrodes 116, 118, 216, 218 is not rectangular, although they are shown in the drawings in this manner. The most favorable shape consists in particular in that the edges of the electrodes at those locations where they "protrude" from underneath the movable electrodes, i.e. the secondary oscillators 114, 230a, 230b, 232a, 232b, extend along a radius of rotation, internally and externally thereof, in order to introduce no capacitance changes (in the ideal case the surface of a plate-type capacitor), which are superimposed on the quantity to be measured and may lead to measuring errors, in the capacitive detection of the secondary oscillation due to the rotational movement of the secondary oscillators. The secondary oscillators may also have different shapes from a rectangular one, a s long as they have a major surface parallel to the major surface of the primary oscillator.

As with the first embodiment of the present invention, it can be pointed out that the major surfaces, i.e. the surfaces depicted in FIG. 2, both of the primary oscillator and of the secondary oscillators are arranged in the x-y plane, with the primary oscillation being produced in this plane as well. This produces, by rotation of the sensor, a Coriolis force normal to the x-y plane, so that no projecting elements are necessary, either.

Figure 3:
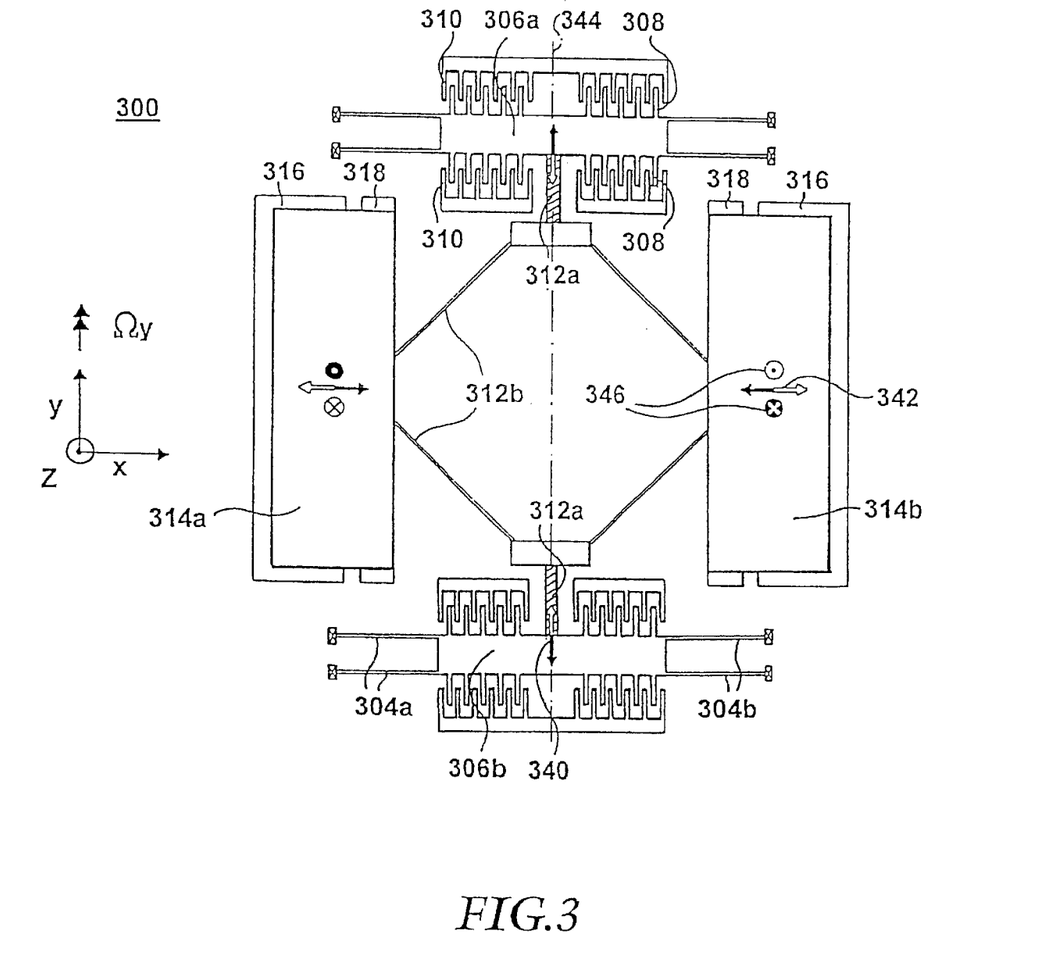
FIG. 3 shows a plan view of a rotational rate gyroscope according to a third embodiment of the present invention.

FIG. 3 shows a plan view of a rotational rate gyroscope 300 according to a third embodiment of the present invention. Rotational rate gyroscope 300 operates on the tuning fork principle, as known to experts and described by J. Bernstein, S. Cho, A. I. King, A. Kourepins, P. Maclel and M. Weinberg, in "A Micromachined Comb-Drive Tuning Fork Rate Gyroscope", Proc. IEEE Micro Electromechanical Systems Conference, Florida, USA, February 1993, pages 143 to 148. As shown in FIG. 3, rotational rate gyroscope 300 comprises a first primary oscillator 306a as well as a second primary oscillator 306b. Both the first primary oscillator 306a and the second primary oscillator 306b are attached to a base member (not shown) by means of identical primary oscillator suspensions 304, with each primary oscillator suspension being composed of an anchoring means 304a and a spring beam 304b. Each primary oscillator furthermore comprises electrode groups 308 engaging with fixed electrode groups 310, in order to cause first primary oscillator 306a as well as second primary oscillator 306b to perform a translational oscillation parallel to the y axis. Each primary oscillator is connected, by means of a secondary oscillator suspension 312, to a secondary oscillator consisting of a first secondary oscillator 314a and a second secondary oscillator 314b. Each secondary oscillator suspension 312 consists of two torsion springs 312a and four spring beams 312b.

When an a.c. voltage is applied to the comb drives constituted by the respective electrode groups 308 and 310, in such a manner that first primary oscillator 306a oscillates in opposite phase to second primary oscillator 306b, as indicated by arrows 340 on the primary oscillators, the translational movement of primary oscillators 306a and 306b directed parallel to the y axis is transformed, via secondary oscillator suspension 312, to a translational movement parallel to the x axis of the first and second secondary oscillators 314a and 314b, as indicated symbolically by arrows 342 on the secondary oscillators. It is apparent to experts from FIG. 3 that the opposite-phase movement of both primary oscillators also results in opposite-phase movement of both secondary oscillators.

When rotational rate gyroscope 300 is subject to rotation about an axis 344 parallel to the y axis, a Coriolis force is generated acting on first and second secondary oscillators 314a and 314b, as shown symbolically by the known notation 346. The movements of first and second oscillators 314a and 314b are detected by sensing electrodes 316 therebeneath and by additional electrodes 318 therebeneath, respectively, with the first and second secondary oscillators constituting a differential capacitive detector with a respective sensing electrode therebeneath. Frequency balancing and feedback, as described in conjunction with the first embodiment of the present invention, are possible analogously therewith by means of additional electrodes 318, if necessary.

Spring beams 304b as well as anchoring means 340a of primary oscillator suspensions 304 permit movement of each primary oscillator in the y-direction, whereas they prevent movement in the direction in which the Coriolis force acts, i.e. in z direction, when their cross-sectional geometry is designed in corresponding manner, as elucidated in the last embodiments. Spring beams 312b of secondary oscillator suspension 312 are designed such that they fulfil the desired spring characteristics in the lateral direction, i.e. the x direction, whereas they are very rigid in the z direction. Torsion springs 312a prevent tilting of electrode groups 308 of primary oscillator with respect to fixed electrode groups 310 and thus a retroactive effect of the measurable quantity on the energization or comb drive. Torsion springs 312a thus permit rotational oscillation of secondary oscillator 314a and 314b, without the secondary oscillation being transferred back to primary oscillators 306a and 306b.

As with the two preceding embodiments of the present invention, it can be pointed out that the major surfaces, i.e. the surfaces depicted in FIG. 3, both of the primary oscillator and of the secondary oscillator are arranged in the x-y plane, with the primary oscillation being generated in this plane as well. Rotation of the gyroscope or sensor thus produces a Coriolis force normal to the x-y plane, so that protruding elements are not necessary here, either.

Figure 4A:
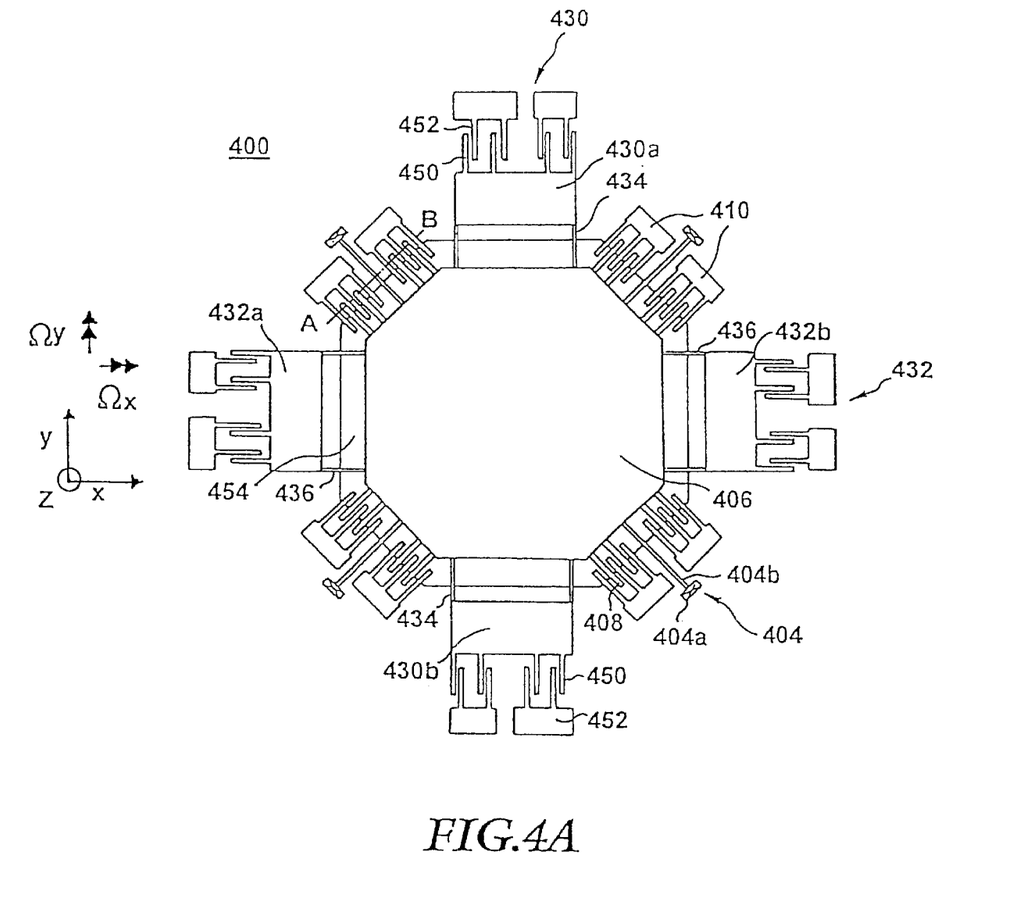
FIG. 4A shows a plan view of a rotational rate gyroscope according to a fourth embodiment of the present invention.
Figure 4B:
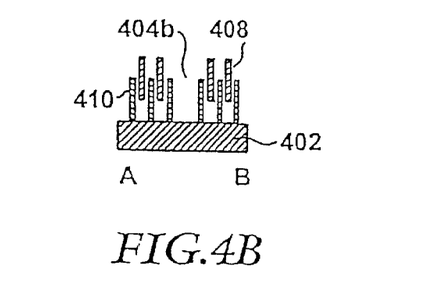
FIG. 4B shows a sectional view of the rotational rate gyroscope of FIG. 4A along the line A–B.

FIG. 4A shows a plan view of a rotational rate gyroscope 400 according to a fourth embodiment of the present invention, whereas FIG. 4B shows a cross-section thereof along the line A–B. Rotational rate gyroscope 400 comprises a primary oscillator 406, connected to a base member 402 by means of primary oscillator suspension 404 consisting of four units. A unit of primary oscillator suspension 404 comprises an anchoring means 404a and a spring beam 404b. The anchoring means is connected to base member 402 and to spring beam 404b, whereas the spring beam connects the anchoring means and primary oscillator 406. Primary oscillator 406, furthermore, comprises four electrode groups 108 engaging in electrode groups 410 that are fixed, i.e. connected to base member 402, so as to form one comb drive each.

A cross-section of the comb drive is shown in FIG. 4B. A special feature of the comb drive shown in cross-section in FIG. 4B consists in that it is a vertical comb drive through which, when a suitable a.c. voltage is present, the primary oscillator can be caused to perform a translational oscillation in z direction.

Spring beams 404b of primary oscillator suspension 404 are dimensioned such that they permit deflection in z direction, whereas they are substantially rigid with respect to forces in the x-y plane.

A first secondary oscillator 430, consisting of a first part 430a and a second part 430b, is connected to primary oscillator 406 by means of a first secondary oscillator suspension 434. Analogously therewith, a second secondary oscillator 432, consisting of a first part 432a and a second part 432b, is connected to primary oscillator 406 via a second secondary oscillator suspension. The first secondary oscillator suspension 434 and the second secondary oscillator suspension 436 are each in the form of spring beams which are substantially rigid in z direction while they are deflectable in the x and y directions, respectively. Furthermore, the first and second parts of first secondary oscillator and second secondary oscillator, on their sides opposite the secondary oscillator suspensions, each have a secondary oscillator electrode group 450, with a fixed sensing electrode group 452 being located opposite each secondary oscillator electrode group 450 in the manner of a comb drive. The comb-like interengagement of secondary oscillator electrode group 450 and fixed sensing electrode group 452 is designed such that shifting of secondary oscillator electrode group 450 parallel to the x axis can be detected by a capacitance change of the comb arrangement.

As can be seen in FIG. 4A, the axis of symmetry of first secondary oscillator 430 is parallel to the y axis, whereas the axis of symmetry of second secondary oscillator 432 extends parallel to the x axis. Furthermore, second secondary oscillator 432, analogously with first secondary oscillator 430, comprises secondary oscillator electrode groups and sensing electrode groups engaging therewith in comb-like manner and capable of detecting a displacement of secondary oscillator 432, i.e. of first and second parts 432a and 432b of secondary oscillator 432, parallel to the y axis. The primary oscillator optionally has a primary oscillator sensing electrode 454 disposed therebeneath, in order to capacitively detect the primary oscillation and balance the same as already described hereinbefore, respectively. Movement of the primary oscillator in the z direction, as an alternative analogous with the two first embodiments, could be measured by means of further additional vertical comb drives for detection, which are similar to the comb drives for driving. To this end, one or two vertical comb drives could enable capacitive detection. Optionally, the movement of the secondary oscillator could be detected by means of vertical comb drives as well.

When rotational rate gyroscope 400 is rotated at an angular velocity $\Omega_y$ about an axis parallel to the axis of symmetry of first secondary oscillator 430, which is parallel to the y axis, the translational primary movement of first secondary oscillator 430 in z direction, which is transferred from primary oscillator 406 via secondary oscillator suspension 434, effects a Coriolis force causing movement of secondary oscillator 430 in x direction, which can be detected capacitively by means of the fixed sensing electrode group 452 and the primary oscillator sensing electrode group 454. Analogously therewith, rotation of rotational rate gyroscope 400 about an axis parallel to the axis of symmetry of second secondary oscillator 432, which is parallel to the x axis, effects a Coriolis force on secondary oscillator 432, thereby causing movement of secondary oscillator 432 in the y direction which also is detected capacitively. It is to be noted here that the first part 430a of the first secondary oscillator and the second part 430b of the first secondary oscillator perform an equiphase translational movement, which is also the case for the first and second parts 432a and 432b of second secondary oscillator 432. Frequency balancing as well as feedback, as described in conjunction with the first embodiment of the present invention, optionally can be realized with the aid of additional comb-like electrodes, parallel to those illustrated, on the secondary oscillator, along with corresponding fixed counter-electrodes (not shown in FIG. 4A).

As an alternative to the vertical comb drive realized by the primary oscillator electrode groups 408 and by corresponding fixed electrode groups 110, primary oscillator 406 can also be driven capacitively by primary oscillator sensing electrode 454.

As was already pointed out several times, the major surfaces, i.e. the surfaces shown in FIG. 4A, both of the primary oscillator and of the secondary oscillator are arranged in the x-y plane in the fourth embodiment, too, with the primary oscillation in fact being generated normal to this plane, but the secondary oscillation taking place in this plane. A rotation of the sensor thus generates a Coriolis force normal to the x-y plane or in the x-y plane, i.e. the major surface of the oscillators; projecting elements for deflecting the secondary oscillator are not necessary in this case, either.

Figure 5:
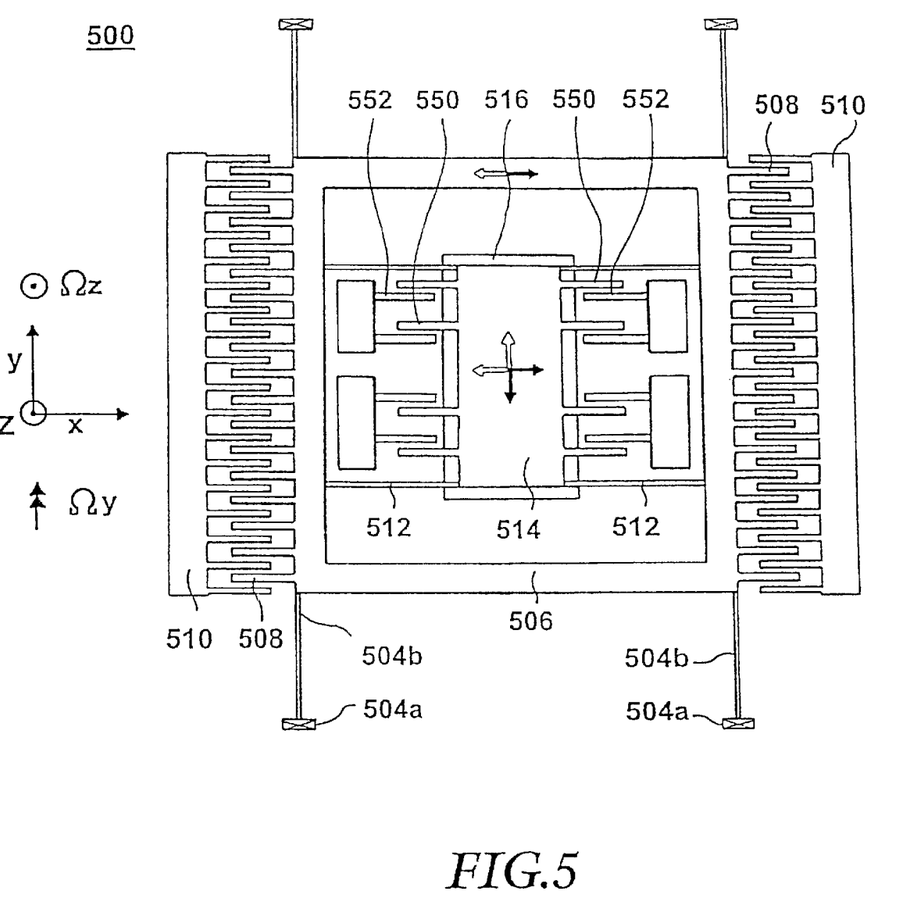
FIG. 5 shows a plan view of a rotational rate gyroscope according to a fifth embodiment of the present invention.

FIG. 5 shows a rotational rate gyroscope 500 according to a fifth embodiment of the present invention. Just like the other rotational rate gyroscopes described hereinbefore, gyroscope 500 comprises a primary oscillator 506 attached to a base member (not shown) by means of a primary oscillator suspension 504 consisting of four anchoring means 504a and four spring beams 504b. For exciting the primary oscillator, i.e. for causing the same to oscillate, the primary oscillator comprises on two opposite sides one electrode group 508 each, arranged opposite a fixed electrode group 510, i.e. an electrode group 510 connected to the base member, so as to form a comb drive for capacitively exciting primary oscillator 506. Primary oscillator suspension 504 is designed to permit oscillation of primary oscillator 506 in the x direction, whereas movement of primary oscillator 506 in the two other directions is effectively avoided. Spring beams 504b thus must be of rectangular cross-section, with the narrow side of the cross-section being selected along the x direction whereas the long side of the cross-section extends along the z direction. It is to be noted here, too, that in addition to the cross-sectional geometry of the spring beams, the anisotropic rigidity of the primary and secondary oscillator suspensions can also be gin achieved by the arrangement of several spring beams of like cross-sectional geometries.

A secondary oscillator 514 is connected to primary oscillator 506 via secondary oscillator suspensions 512, as shown in FIG. 5. Secondary oscillator 514 comprises secondary oscillator electrode groups 550 disposed parallel to the x axis and interengaging in comb-like manner with fixed secondary oscillator sensing electrode groups 552 so as to render possible a capacitive detection of the movement of secondary oscillator 514 in x direction.

When rotational rate gyroscope 500 is rotated with an angular velocity $\Omega_z$ about the axis of symmetry of secondary oscillator 514 which is parallel to the y axis, a Coriolis force acts on secondary oscillator 514 resulting in a substantially translational movement of the secondary oscillator in the z direction. The translational movement of secondary oscillator 514 in the z direction can be detected capacitively by means of a sensing electrode 516 disposed under secondary oscillator 514, analogous with the embodiments described hereinbefore.

When rotational rate gyroscope 500 is rotated with an angular velocity $\Omega_y$ about an axis extending vertically through the center of secondary oscillator 514 and being parallel to the z axis, a Coriolis force acts on the secondary oscillator which causes movement thereof in the y direction. This y-direction movement of secondary oscillator 514 represents a translational oscillation, since the primary oscillator also carries out a translational oscillation. Detection of the movement of secondary oscillator 514 in the y direction takes place capacitively by means of secondary oscillator electrode group 550 and fixed sensing electrode groups 552. It is obvious to experts that the spring beams 512 need to be of substantially square cross-section since they have to permit a deflection both in the z direction and in the y direction. Relative movement between secondary oscillator 514 and primary oscillator 506 is prevented by the arrangement of the spring beams 512 which all extend parallel to the x axis. However, the present embodiment can also be implemented in the form of a one-axis gyroscope or sensor performing a secondary movement in the y direction, with the spring beams then being of rectangular cross-section.

As was already mentioned, the primary oscillator suspension ensures that primary oscillator 504 cannot be moved by the Coriolis force in the y or z directions, since movement of the primary oscillator in the z direction is rendered impossible by the cross-sectional configuration of spring beams 504b, with the arrangement of spring beams 504b parallel to the y axis preventing in addition movement of the primary oscillator in the y direction. It is to be noted here that the anchoring means 504a also need to have such rigidity that they permit no deflection in the y direction.

Differential measurement of the z movement of the secondary oscillator is possible by means of a second "cover electrode", which however is not shown in FIG. 5. This cover electrode is disposed substantially parallel to sensing electrode 516, with secondary oscillator 514 being disposed between the same.

Finally, in case of the fifth embodiment, too, the major surfaces, i.e. the surfaces illustrated in FIG. 5, both of the primary and of the secondary oscillators are arranged in the x-y plane or parallel thereto, with the primary oscillation being generated in this plane and the secondary oscillation either taking place in this plane as well or perpendicularly thereto. Rotation of the sensor thus produces a Coriolis force normal to the x-y plane or in the x-y plane, i.e. the major surface of the oscillators, with projecting elements for deflection of the secondary oscillator being not necessary here, either.

Differently from the embodiments mentioned hereinbefore, especially the second and fourth embodiments may have a multiplicity of secondary oscillators that can be read independently of each other in selective and digital manner, so that the size and direction can be determined in digital manner on the basis of the number and position of the just read secondary oscillators.

For manufacturing rotational rate gyroscopes according to the present invention, micromechanical technologies are used mainly. In realizing the afore-described embodiments, it is necessary, for example, to produce lateral capacitors. These can be made by means of various surface micromechanical processes or by bonding processes. The movable components of the individual rotational rate gyroscopes, furthermore, can be structured by other mechanical methods, such as e.g. punching, cutting or sawing, or also by laser separating techniques, preferably of electrically conductive material, such as e.g. polysilicon. The connection of the movable structures to the base member is effected preferably prior to structuring thereof.

Furthermore, a multiplicity of additional manufacturing processes, such as e.g. injection molding, electroplating or spark erosion, can be used in advantageous manner for making rotational rate gyroscopes according to the present invention.

Finally, it is to be pointed out that, by using two spatially separate joints and component assemblies for the two oscillation modes, a retroactive effect of the secondary movement on the primary movement is largely prevented. In contrast to other, known electrostatically driven Coriolis force gyroscopes, tilting or an undesired, superimposed movement of the comb drive structure is prevented. Measuring errors due to a retroactive effect of the secondary movement on the primary movement are minimized thereby. As was described, balancing of the intrinsic frequencies is possible in addition. For this purpose as well, decoupling of the two oscillation modes is essential, and tilting of the comb drive has to be prevented for rendering possible such effective decoupling.

What is claimed is:

1. A rotational rate gyroscope for detecting rotation thereof, about a first axis and a third axis, comprising the following features:
   a base member;
   a primary oscillator;
   exciting means for exciting the primary oscillator with respect to the base member to perform a primary movement which is directed along a second axis, the first axis, the second axis and the third axis being substantially normal to each other;
   a secondary oscillator adapted to be caused, by a Coriolis force, to perform a secondary movement which is directed along the third axis in case of a rotation about the first axis, and which is directed along the first axis in case of a rotation about the third axis, with major surfaces of the primary oscillator and the secondary oscillator extending substantially in a plane, defined by the first axis and the second axis, and the movement of the primary oscillator taking place in this plane;
   a primary oscillator suspension for holding the primary oscillator so as to be movable with respect to the base member along the second axis, while a movement of the primary oscillator with respect to the base member along the first axis and the third axis is substantially prevented;
   a secondary oscillator suspension being separate from the primary oscillator suspension for connecting the primary oscillator to the secondary oscillator,
   the secondary oscillator suspension being formed such
      that it transfers the primary movement to the secondary oscillator substantially in rigid manner;
      that it allows a movement of the secondary oscillator with respect to the primary oscillator in the directions of the third axis and the first axis; and
      that it substantially prevents a transfer of the secondary movement back to the primary oscillator;
   first detection means for detecting a movement of the secondary oscillator along the first axis, the first detection means having a secondary oscillator electrode group attached to the secondary oscillator and having a fixed sensing electrode group attached to the base member,
   the secondary electrode group and the fixed sensing electrode group being in a comb-like interengagement; and
   second detection means for detecting a movement of the secondary oscillator along the third axis, the second detection means having the secondary oscillator as a movable electrode and a fixed sensing electrode, which is attached to the base member.

2. The rotational rate gyroscope according to claim 1, wherein the primary oscillator suspension comprises a plurality of spring beams extending in the direction of the first axis, being deflectable in the direction of the second axis, and being connected to the base member via anchoring means.

3. The rotational rate gyroscope according to claim 2, wherein the spring beams have a rectangular cross section having a narrow side and a long side, the narrow side extending along the second axis, and the long side extending along the third axis.

4. The rotational rate gyroscope according to claim 1, wherein the exciting means comprises at least one electrode group which is in engagement with a fixed electrode group so as to capacitively excite the primary oscillator parallel to the second axis in order to obtain the primary movement.

5. The rotational rate gyroscope according to claim 1, wherein the primary oscillator comprises a recess in which the secondary oscillator is positioned by means of the secondary oscillator suspension, and in which also the first and the second detection means are arranged.

6. The rotational rate gyroscope according to claim 1, wherein the secondary oscillator suspension comprises a plurality of spring beams disposed parallel to the second axis and connecting the primary oscillator to the secondary oscillator, the spring beams furthermore being of substantially square cross-section so as to permit a deflection both in the z direction and in the y direction.

7. The rotational rate gyroscope according to claim 1, wherein the second detection means further comprises a cover electrode being arranged with respect to the fixed sensing electrode such that the secondary oscillator is disposed between the cover electrode and the fixed sensing electrode in order to allow differentially measuring the secondary movement along the third axis.

* * * * *